Figure 1:
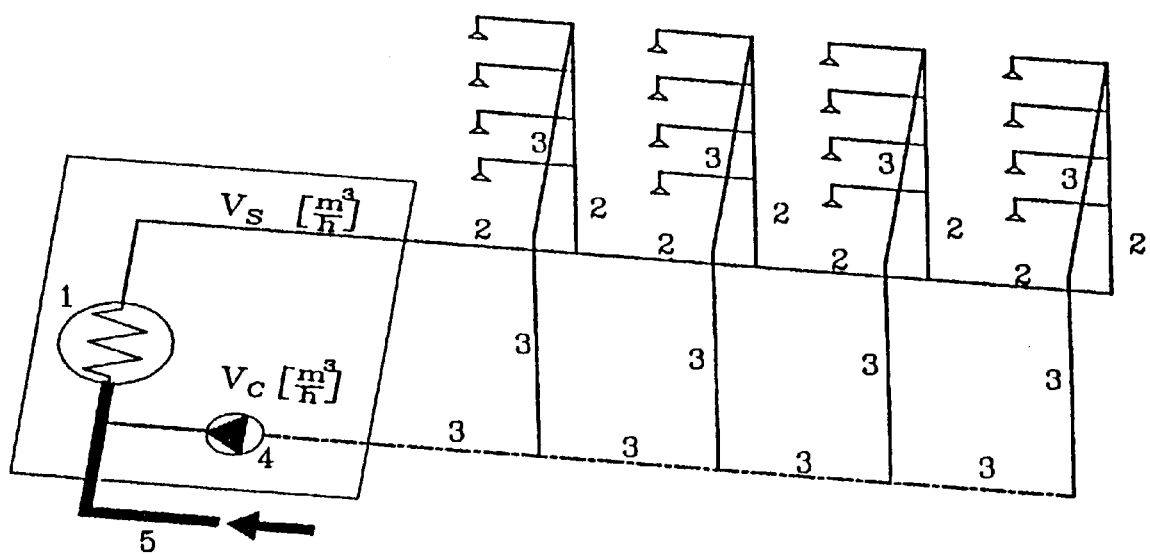

United States Patent [19]
Szilagyi

[11] Patent Number: 6,125,880
[45] Date of Patent: Oct. 3, 2000

[54] MASS FLOW (VOLUME FLOW) STABILIZED CIRCULATION NETWORK

[75] Inventor: Sandor Szilagyi, Debrecen, Hungary

[73] Assignee: Komfort 2001 Ltd., Debrecen, Hungary

[21] Appl. No.: 09/417,069

[22] Filed: Oct. 13, 1999

[51] Int. Cl.[7] .................................................. F16L 53/00
[52] U.S. Cl. ...................... 137/340; 137/334; 137/563; 137/884; 137/357
[58] Field of Search .................................. 137/334, 340, 137/563, 884, 357

[56] References Cited

U.S. PATENT DOCUMENTS

| | | | |
|---|---|---|---|
| 4,367,785 | 1/1983 | Allen | 165/283 |
| 5,316,038 | 5/1994 | Salvador et al. | 137/334 |
| 5,881,763 | 3/1999 | Angelos | 137/340 |
| 5,927,337 | 7/1999 | LaMantia | 137/883 |
| 6,047,417 | 4/2000 | Derakhshan | 4/877 |

Primary Examiner—A. Michael Chambers
Assistant Examiner—Thomas L. McShane
Attorney, Agent, or Firm—Keil & Weinkauf

[57] ABSTRACT

Subject of the invention is a mass flow (volume flow) stabilising circulation system, which consists of independently operated circulation loops via two or more mass flow stabilising bridges (6). (FIG. 2)

Furthermore the subject of the invention is a mass flow (volume flow) stabilising bridge (6), which consists of the hydraulic bridge (9) with inlet (7) and outlet (8) primary couplings, the outlet (10) and inlet (17) secondary couplings, furthermore the secondary delivery pipe (2b) with outlet connection (12) and the secondary return pipe (3b) with inlet connection (13). An equipment for circulation (4) is installed into the secondary return pipe (3b). (FIG. 3).

7 Claims, 3 Drawing Sheets

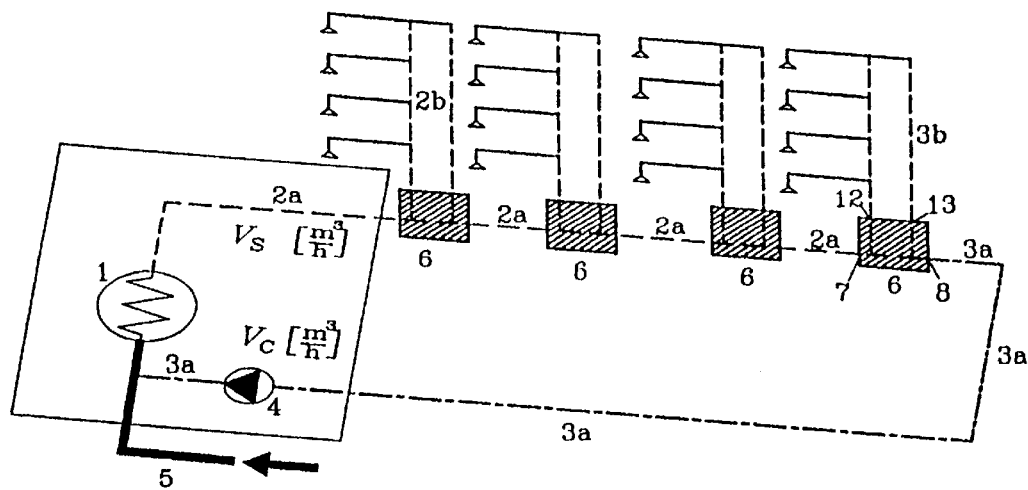
figure 2
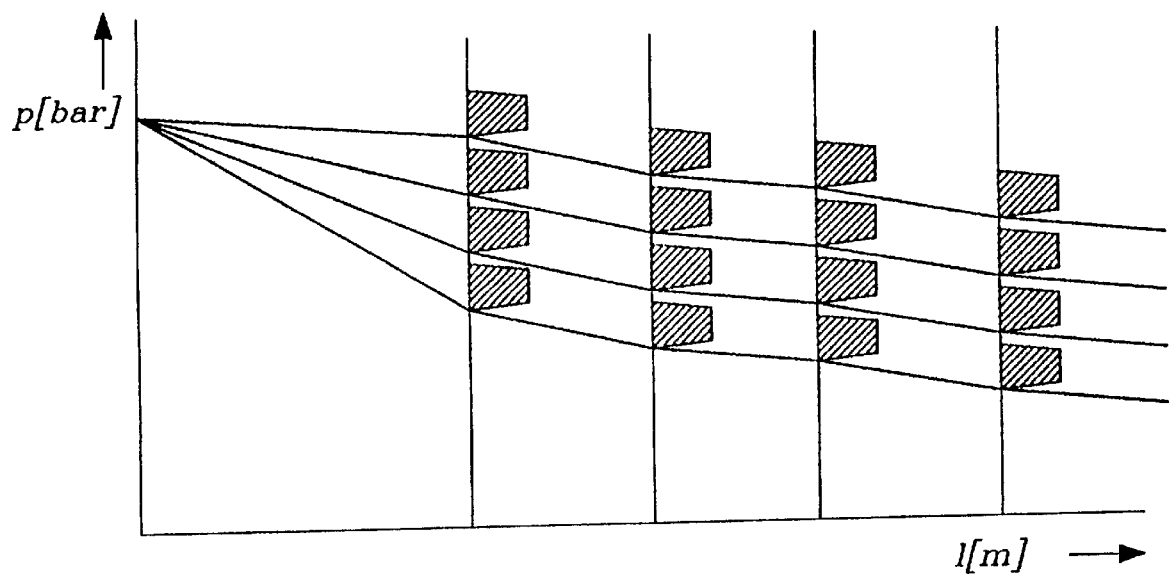
figure 2/a

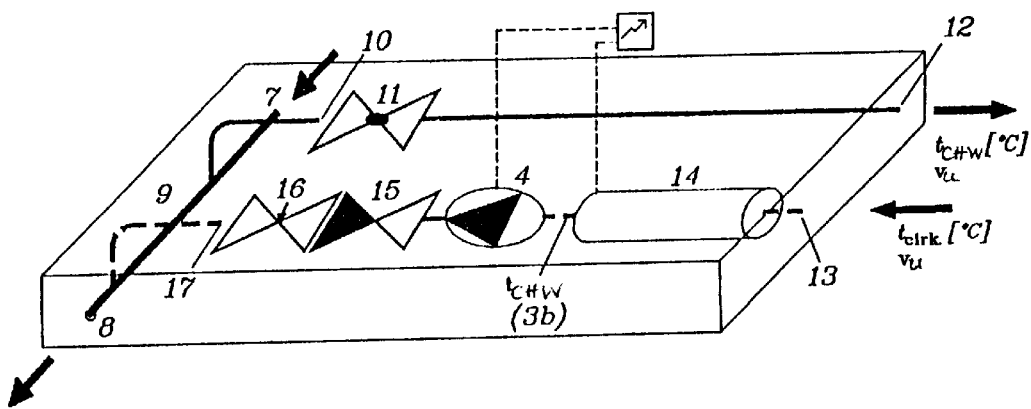
figure 3
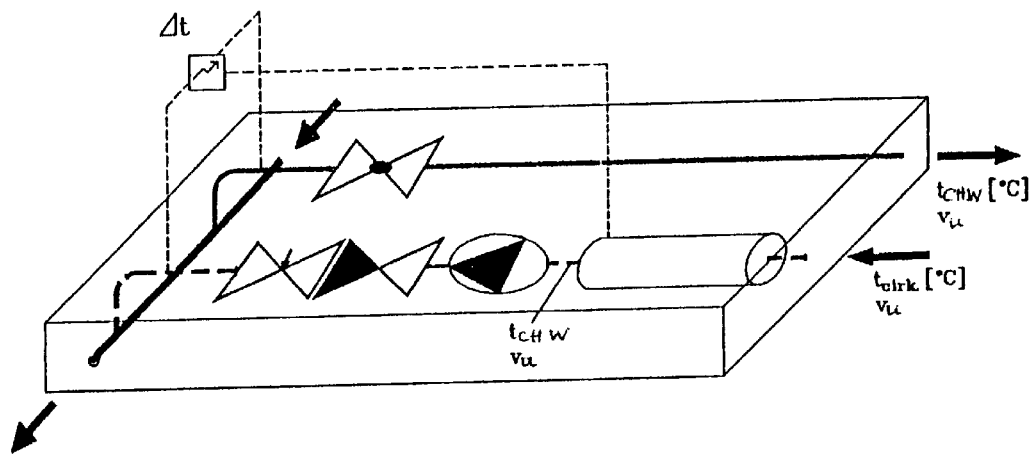
figure 3/a
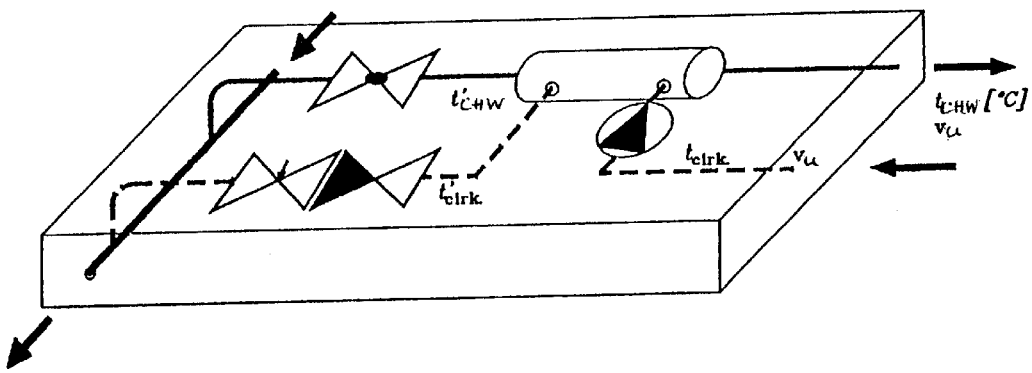
figure 3/b

MASS FLOW (VOLUME FLOW) STABILIZED CIRCULATION NETWORK

Subject of the invention is a mass flow (volume flow) stabilised circulation network relieved of the pressure fluctuation of the distribution system.

Furthermore the subject of the invention is a so-called mass flow stabilising bridge by means of which the network can be established.

The invention is used preferably for the development and economical operation of a consumable hot water (CHW) service loop, since it is able to eliminate the problems arising from the distribution, economization and account.

Balanced grade service of users located in different distances from the heat-generating site is a required demand against the up-to-date economical CHW network.

In the literature there are known solutions on a number of users connected in parallel or circulation loops consisting of user subsystems (Recknagel, Sprengel, Schramek: Taschenbuck für Heinzung und Klimatechnik R. Oldenburg Verlag, München, pages 1580–1628).

Some actual connecting arrangements published in the literature review the solution of some partial tasks, e.g. the temperature control or the quantity measurement of the consumed water. U.S. Pat. No. 1,708,287 claims a circulating water heating system in which solution the heating service loop is parallel connected with the user heating circulation loop. The controlling unit of the circulation network is a three-way valve built into the corner point of the service loop. The circulation pump is built into the service circulation loop. Above set-up allows the water temperature control even during the consumption too. A similar solution is claimed in the U.S. Pat. No. 4,065,054 and German Patent No. 2 104 535 as well. In the Hungarian Patent No. 200 227 a connecting arrangement is published in which the service circulation loop beside the pump and heat exchanger contains a hot water holding tank too. The users are on an independent circulation loop, which is operated by a pump. The pump circulates the user hot water through the secondary circuit of a heat exchange being connected to the primary circuit through an auxiliary piping in which set-up the secondary circuit is connected to the primary circuit through a heat exchanger and a mass flow meter. The measuring unit constructed by the above way and implemented into the independently circulated internal loop is able to measure the exact quantity of the consumed water.

A conventional CHW network (FIG. 1) consists of a heat-generating equipment 1, CHW pipe 2, circulation loop 3 and pump 4 built into the circulation loop. Cold water pipe 5 is used to fill the network with water. The CHW pipe 2 ranges from the heat-generating equipment till the last user supplying port (user service border), and the circulation loop 3 being responsible in the network for the circulation ranges from the last user supplying port till the heat-generating equipment.

In the case of the conventional CHW service circulation network the mass flow (volume flow) of the circulated water is expressed as follows:

$$V_c = c \times \beta \times V = \frac{c \times V}{\eta_b}$$

wherein $V = V_s + V_u$ m(kg) mass of water being in the piping system of the denominated circulation loop $m_c$(kg/s) mass of water circulated in the denominated piping system V($m^3$) volume of water being in the denominated circulation loop $V_c$($m^3$/h) volume of water being circulated in the piping system of the denominated circulation loop c circulation number $_u$ and $_s$ index relating to the user and the service loops $\beta$ coefficient relating to the adjustment between the user side and the service side $$\eta_b = \frac{1}{\beta} \quad \text{yield of the adjustment}$$

In cases of the conventional systems the value of is regularly more than 1, generally its value is in the range of 1,5–2,0. Consequently refers to the uncontrollable possibility of the conventional CHW circulation network.

Independently on the number of the parallel-coupled users ports or the number of the hydraulic subloops in the above-mentioned conventional system it composes a circulation network operated by an equipment (pump). Until there is not any consumption the system is in equilibrium, however in case of consumption at any user port the equilibrium became unbalanced.

One of the major problems of the operation of hot water service loops is that tile consumption of the hot water is not constant, and highly depends on the time of day, i.e. the highest consumption is in the morning and evening time. The fluctuation in the consumption is continuous generating a pressure change in a relatively wide range. The central circulation loop should be adjusted to these indefinable pressure changes. The circulation network of tile hot water supply of hundreds of flats should be operated in a way the users to obtain a similar service level, i.e. getting the hot water in the required quantity and temperature. In order to gain a proper circulation ratio in each part of the system, due to the poor distribution the network is planned unreasonably large. Evidently a larger system has a larger heat loss too. The circulation of a large quantity of water needs a pump with a high capacity, which unduly has a high investment cost and high power uptake as well.

Further disadvantages of the conventional networks are:

They are not able to stabilise the mass flow in the central hot water circulation network neither in the user nor in the service sides, and consequently they are not able to assure a service in a high quality. (Always there are user ports where the temperature of the water is lower than the demand.)

Such type of service does not make demand against the user system, or rather the conventional network set-up is inadequate for making any demand, since it does not contain any proper solution to separate the borders between the users and the service. For this reason the responsibilities between the users and the service can not be separated either, and even the interest dependency of the service can not be determined between the user and the service.

The Legionellosis also should be mentioned here as in recent years in connection with the CHW service the attention was focused on it. The pathogens of the above are the bacteria discoverable anywhere in the surface-water and causing serious pneumonitis in men's lung, and which are easy able to multiplicate in a CHW network being constructed not in a proper way. (K. Seidel: Bundesgesundheitsblatt 2/90, Bundesgesundheitsamt/WaBoLu/DVGW Richtlinien/WHO/DINRaumlufttechnhnik Page 1–7)

Object of the procedure in the invention is the elimination of the disadvantages of the above listed CHW networks.

According to the procedure the service side and the users side can be separated from each other by means of the implementation of a so-called "mass flow stabilising bridge". It allows establishing a completely separated user loop from the service loop, which is mass flow (volume flow) stabilised and free of pressure fluctuation. The mass flow stabilisation means the controlling of the circulated water mass flow of the user loop and the service loop within the required operational range. Tile improvement of the circulation conditions reduces or eliminates the risk of the formation of the dead water being responsible for the Legionellosis.

The circulation network discussed in this invention basically differs from the conventional circulation networks being operated by one equipment (pump), since it is operated by more equipment (pumps), e.g. the hydraulic sub-loops are operated in self-contained systems consisting of a service circulation loop and number of independent users circulation loops. Each user circulation loop is connected to the service-circulation loop through a mass flow stabilising bridge.

The FIG. 2 presents a possible accomplishment of the circulation network discussed in this invention. The network consists of the heat-generating equipment 1, the service side CHW pipe 2a (ranging from the heat-generating equipment till the inlet port 7 of the last mass flow stabilising bridge 6), the service-circulation loop 3a (ranging from the outlet port 8 of the last mass flow stabilising bridge 6 till the heat-generating equipment 1) and the pump 4 being installed into tile circulation pipe 3. The cold water pipe 5 is used for the water supply. Above listed items consist of the service-circulation loop. Each user circulation loop is connected to the service-circulation loop through the mass flow stabilising bridge 6. Each user circulation loop consists of the user side CHW pipe 2b (ranging from the outlet port 12 of the mass flow stabilising bridge 6 till the last user service port) and the user circulation pipe 3b (ranging from the last user service port till the inlet port 13 of the mass flow stabilising bridge 6).

The mass flow stabilising bridge 6 is presented in details in the FIG. 3. The mass flow stabilising bridge 6 consists of the hydraulic bridge 9 with inlet 7 and outlet 8 primary couplings, and outlet 10 and inlet 17 secondary couplings, the secondary delivery pipe 2b with outlet connection 12 and the secondary return pipe 3b with inlet connection 13. The secondary outlet port 10 of the hydraulic bridge 9 is connected to the secondary delivery pipe 2b, while the secondary inlet port 13 to the secondary return pipe 3b. A shut-off valve 11 is implemented into the secondary pipe 2b. Pump 4 is installed into the secondary pipe 3b, while the pipe 3b is mounted with the back-pressure valve 16, quantity-adjusting unit 15 and in a particular case with temperature correction 14.

The circulation pump 4 determines the circulation conditions at the user side. Depending on the demand the pump 4 can be operated continuously or batchwise.

For the adjustment of mass flow (volume flow) of the user system the quantity-adjusting unit 15 settled to the pump 4 is used. The flow directions became well-determined by means of the back-pressure valve 16.

There are two basic ways for the application of the mass flow stabilising bridge 6.
Prefabricated unit (FIG. 3a) to be installed into the new or the existing system. In the last case the prefabricated bride can be implemented into the system by means of cutting the proper section of the CHW pipe and the delivery and the return pipes of the user CHW system are connected simultaneously to the primary ports 7,8 of the hydraulic bridge 9.

It can even be installed into a existing network by means of the utilisation of the present system transferring the existing pipeline into the hydraulic bridge, i.e. the user circulation pipe with the proper diameter is reconnected to the CHW pipe (FIG. 3b). Taking into consideration, that the establishment of the hydraulic bridge 9 depends on the parameters of the existing system, designing is needed in such a case for studying the installation of the hydraulic bridge.

Independently on the pressure fluctuation of the service loop the circulation network developed by the above way with the application of the mass flow stabilising bridges 6 is able to stabilise the mass flow (volume flow) of the user CHW circulation loop via filtering the pressure fluctuations in the service loop of the network by the operation of the user CHW circulation loop being supported by mass flow stabilising bridges. Furthermore it can be concluded, that two independent hydraulic loops are established with a pressure difference of zero between the service and the user loops. Consequently there are circulated mass flow (volume flow) loops both on the service side and the user side. Circulation conditions can be characterised by the circulation number "c".

The circulation number is $$c = \frac{m}{m} \text{ or } c = \frac{V}{V}$$

if
$c_u$ circulation number of the user side
$c_s$ circulation number of the service side
$c_u = c_s$ adjustment of the operating mode is needed in the range of $$\frac{c_u}{c_s} = 0,8 - 1$$

Normal operating conditions $V_u \ll V_s$
Critical state of the operation $V_u = V_s$ The scheme presented in FIG. 2a indicates that as a result of the implementation of the mass flow stabilising bridge 6 the use circulation system floated on the pressure state of service system reduces to zero the operational effects rising from the pressure fluctuations of the service system. Pressure values are indicated on the Y-axis, and the distance from the heat-generating centre 1 is plotted on the X-axis. At different consumption time the solid lines indicate the pressure values in tile pipes 2a, and the shaded areas represent the pressure ranges in the pipe lines 3a, 3b. It can be seen that tile pressure values are identical at the connection points of the service and the user loops being at equal distances from the heat-generating centre 1, namely there is not pressure difference between the service and the user loops. Denoting to the adjusting conditions of tile conventional systems the above facts mean that the value of and consequently the yield of the adjustment is equal to about 1.

Tie mass flow (volume flow) stabilised circulation network is adaptable into the service systems and also into the user subsystems too.

In cases of the conventional CHW service systems a central circulation of the hot water solves the maintenance of the requested temperature of the consumable hot water at the users ports.

The application of the process of tile invention supports the separation of tile service and the user circulation loops, and provides an opportunity for the independent temperature compensation of the user circulation and the service loops.

Depending on the state of the user loop (e.g. degree of thermal isolation) the temperature of the return (cooled) water in the loop has a large variety, which is the user's competence. The temperature compensator 14 (e.g. electric heating jacket) implemented into the secondary return pipe 3b of the mass stabilising bridge 6 heats up the water which was cooled before in the user system. Consequently the causeless water temperature reduction in the service loop can be eliminated. Furthermore the service providing company does not responsible for the energy loss in the user loop and it can be charged to the user. The temperature compensation provides a possibility to separate the heat loss of the user system from the service side, and consequently the disinterest being in the former user system can be reduced, moreover the losses of the user side does not charges the service system.

For the above reasons in cases of service systems the mass flow stabilising bridge 6 is recommended to be built in by the combination of temperature compensation.

Ways of temperature compensations:

1. Complete temperature compensation 1.1. Application of a constant power compensation unit (FIG. 4a). The capacity of the heating unit is adjusted to the cooling rate determined by measurement or taking out the quantities and the operation of the temperature compensation is started by the actuation of the user circulation pump.

1.2. In the function of the temperature reduction of the user loop ($2t=t_{CHW}-t_{circ}$) by the application of a heating unit with adjustable capacity (FIG. 4b). The heating unit specified above heats by the capacity determined according to the signal t (° C.) between the CHW and the circulation loops.

2. Partial compensation (FIG. 4c)

Formation of a system the quality of which depends upon the partial or complete fulfillment of the demand.

The CHW entering into the user system preheats the cooled circulated water. Depending on its own system the user receives a lower quality of water.

Only partial heat compensation is provided for the user.

Losses due to the partial compensation are counted separately.

In the case of a mass flow stabilised circulation system $$n = 1 - \frac{V_{uCHW}}{V_{uCHW} + V_{sCHW}}$$

and taking into consideration the above factor the mass flow of the circulated CHW can be determined by the following equation:

$$V_{cirk\ stab} = \eta_b \times n \times V_{cirk} \ (m3/h)$$

The cooling of the hot water network can be calculated similarly to the conventional circulation system. By the reduction of the mass flow of the circulated water the rate of the medium being circulated in the network is reduced to $$V_{cirk\ stab} = V_{cirk} \times n \ (m/s)$$

wherein the reduction in the heat-transfer coefficient (W/m²K) means also the reduction in the heat loss in the network.

The circulation system developed by the mass flow stabilising bridge 6 and equipped with the temperature compensation 14 is able to optimise the distribution of the system, and consequently reduces the heat loss of the system and in case of the investment the costs too.

In case the mass flow stabilising system is implemented into a user subsystem, the temperature compensation unit can be eliminated.

Advantages of the system:

By the application of known constructional elements the establishment of a basically new operational system can be reached, which guarantees the operation of each circulation systems and consequently the service level is improved as well.

It reduces or eliminates the formation of the Legionellosis.

It provides a solution for the separation in to wll dwtermined systems of the previously totally integrated service and user loops from each other.

The stabilisation of the separated operation establishes the conditions of the temperature compensation at the user side.

It reduces the service costs by the reduction in the heat loss, the reduction in the electric energy uptake, the reduction in the continuous operational activities, the elimination of the losses of the separated user side, a reduction of the operational equipment in size.

| | List of symbols |
|---|---|
| 1 | heat-generating equipment |
| 2 | CHW pipe |
| 2a | service CHW pipe |
| 2b | user CHW pipe |
| 3 | circulation loop |
| 3a | service circulation pipe |
| 3b | user circulation pipe |
| 4 | pump (equipment for circulation) |
| 5 | cold water pipe |
| 6 | mass flow stabilising bridge |
| 7 | inlet primary connection |
| 8 | outlet primary connection |
| 9 | hydraulic bridge |
| 10 | outlet secondary connection |
| 11 | shut-off valve |
| 12 | outlet connection of the secondary outgoing pipe 2b |
| 13 | inlet connection of the secondary return pipe 3b |
| 14 | temperature compensation |
| 15 | quantity adjusting unit |
| 16 | back-pressure valve |
| 17 | inlet secondary connection |

What is claimed is:

1. A mass flow (volume flow) stabilising bridge, which consists of a hydraulic bridge (9) with inlet (7) and outlet (8) primary couplings, and outlet (10) and inlet (17) secondary couplings, furthermore a secondary delivery pipe (2b) with outlet connection (12) and a secondary return pipe (3b) with inlet connection (13), wherein the secondary outlet port (10) of the hydraulic bridge (9) is connected to the secondary delivery pipe (2b), while its secondary inlet port (13) to the secondary return pipe (3b) and the circulation equipment (4) is installed into the secondary return pipe (3b).

2. The mass flow (volume flow) stabilising bridge as is claimed in claim 1, wherein it contains a shut-off valve (11) in the secondary delivery pipe (2b).

3. The mass flow (volume flow) stabilising bridge as is claimed in claim 1, wherein it contains a back-pressure valve (16) in the secondary return pipe (3b).

4. The mass flow (volume flow) stabilising bridge as is claimed in claim 1, wherein it contains a the quantity-adjusting unit (15), in the secondary return pipe (3b).

5. The mass flow (volume flow) stabilising bridge as is claimed in claim 1, wherein it contains a temperature compensation (14) in the secondary return pipe (3b).

6. A mass flow (volume flow) stabilising circulation system, wherein it contains independently operated circulation loops with the application of the mass flow stabilising bridge (6) implemented into any circulation system streaming liquid or air.

7. A mass flow (volume flow) stabilising CHW service circulation system as is claimed in claim 6, which contains a service circulation loop and user circulation loops operated independently from each other, and the user circulation loops are connected into the service circulation loop via the mass flow stabilising bridge (6).

* * * * *